United States Patent
Riley et al.

(10) Patent No.: US 10,523,501 B2
(45) Date of Patent: Dec. 31, 2019

(54) INSTALLATION OF NETWORKABLE DEVICES

(71) Applicant: Echelon Corporation, Santa Clara, CA (US)

(72) Inventors: Glen M. Riley, Saratoga, CA (US); Robert A. Dolin, Menlo Park, CA (US); Bernd Gauweiler, London (GB)

(73) Assignee: Echelon Corporation, Santa Clara, CA (US)

( * ) Notice: Subject to any disclaimer, the term of this patent is extended or adjusted under 35 U.S.C. 154(b) by 44 days.

(21) Appl. No.: 14/561,777

(22) Filed: Dec. 5, 2014

(65) Prior Publication Data
US 2016/0164724 A1    Jun. 9, 2016

(51) Int. Cl.
*H04L 12/24* (2006.01)

(52) U.S. Cl.
CPC ............................. *H04L 41/0806* (2013.01)

(58) Field of Classification Search
CPC .................. H04L 41/0803; G06K 7/10366
See application file for complete search history.

(56) References Cited

U.S. PATENT DOCUMENTS

| | | | | |
|---|---|---|---|---|
| 5,519,878 A | * | 5/1996 | Dolin, Jr. .............. | H04L 12/2803 709/220 |
| 2006/0190538 A1 | * | 8/2006 | Hwang ............... | H04L 12/2809 709/204 |
| 2012/0324119 A1 | * | 12/2012 | Imes ....................... | H04L 67/10 709/227 |
| 2014/0169795 A1 | * | 6/2014 | Clough ............... | G06F 19/3418 398/106 |
| 2014/0181521 A1 | * | 6/2014 | Hemphill .............. | H04L 9/0819 713/171 |
| 2015/0023183 A1 | * | 1/2015 | Ilsar ..................... | H04W 48/16 370/244 |
| 2015/0026317 A1 | * | 1/2015 | Ilsar .................... | H04L 41/0816 709/221 |
| 2015/0052231 A1 | * | 2/2015 | Sun ..................... | H04L 41/0803 709/223 |
| 2015/0205990 A1 | * | 7/2015 | Younger ............... | H04W 4/008 340/10.1 |
| 2016/0037436 A1 | * | 2/2016 | Spencer ................ | H04W 48/12 370/338 |

OTHER PUBLICATIONS

Journal article "Secure architecture for the Integration of RFID and sensors in personal networks" (2011-2012) to Najera et al. ("Najera").*
U.S. Appl. No. 61/928,989.*

* cited by examiner

*Primary Examiner* — June Y Sison
(74) *Attorney, Agent, or Firm* — Nicholson De Vos Webster & Elliott LLP (57) ABSTRACT

Embodiments described herein include systems, apparatuses, and methods for attempting to wirelessly communicate with a networkable device with a mobile device to retrieve an identifier for the networkable device; receiving the identifier from the networkable device; storing the identifier in the mobile device; and sending a request to a provisioning server to provision the networkable device.

17 Claims, 11 Drawing Sheets

INSTALLATION OF NETWORKABLE DEVICES

FIELD OF THE INVENTION

The various embodiments described herein relate to device installation.

BACKGROUND

The installation and provisioning of a distributed control system may be complex and require many steps. Installers tend to be trained only to install devices (connect power and other wires as needed) and often make mistakes when required to perform additional steps. Additionally, in some installation scenarios, nodes have to be visited twice with physical push buttons on them, which in many cases includes getting up on ladders and disassembling a fixture to get to a button the second time to provision is time consuming and costly as the second visit is often performed by a highly paid professional.

DETAILED DESCRIPTION

Embodiments detailed herein relate to the installation and provisioning of a distributed system. Once the system is installed, and network addresses are assigned and information about which nodes work with which other nodes (for example in a lighting control system which switch controls which light(s)), then the system is complete and functional.

For residential, industrial, and commercial applications a system is designed and plans are created showing the locations of each device along with its device type. The plans are typically computer readable drawings showing the walls, devices, and potentially a one line electrical diagram. The devices are procured and a laborer or low skilled worker is used to pull the wire for the electrical system and puts the nodes into their proper locations and connect them to power. Once that is complete, an inspection is performed by the system designer/engineer/architect to verify that the devices have been correctly placed and are powered. This inspector also verifies that the devices can be turned on/off or otherwise tests for device functionality. At this point, any errors are referred back to the installer to correct, and the system designer then returns to verify that the work was done properly. When the installation work is complete to the satisfaction of the system designer that particular milestone often triggers a payment to the installer. Then when the system designer demonstrates the system to the owner, a second payment is triggered from the owner to the system designer.

Detailed below are embodiments of several different approaches that build upon this basic workflow. In each approach an installer does the work that is done for the hardwired system and typically without exceptions. A verification individual need only access the completed job site and, using a smartphone (or other mobile hardware device) with some hardware attached to or included with it (for example, a wireless transceiver coupled to an audio jack), verify the node (networkable device) placements and identifiers (such as Media Access Control (MAC) identifiers (IDs)) provided by the node.

Figure 1:
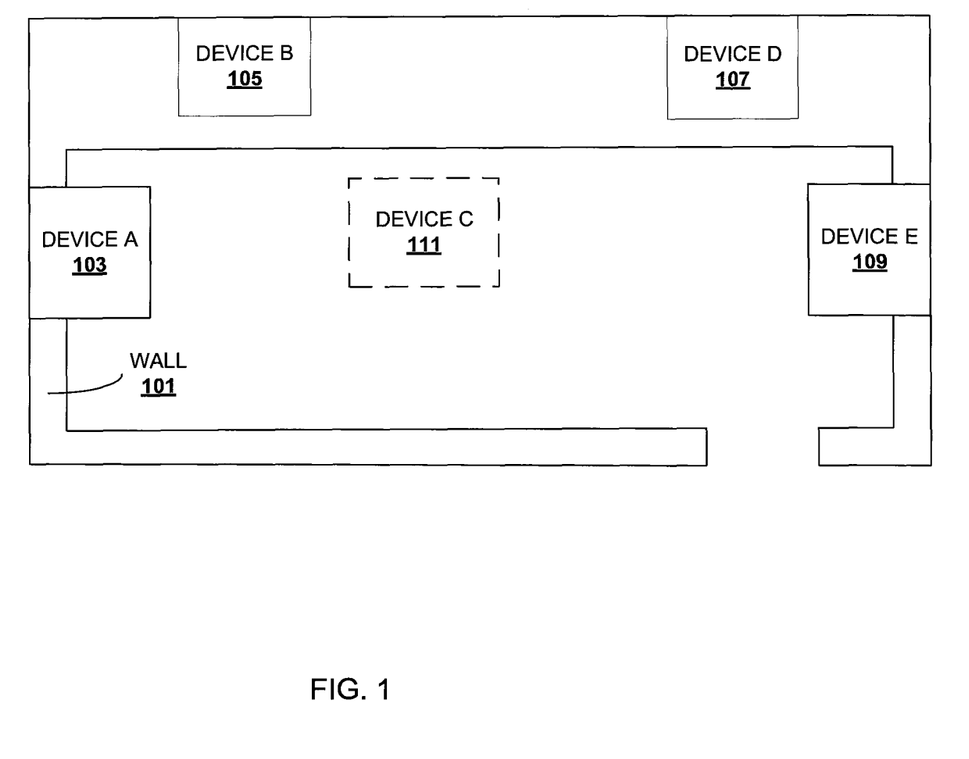
FIG. 1 illustrates an example of a collection of networkable devices (or nodes) at a location.

FIG. 1 illustrates an example of a collection of networkable devices (or nodes) at a location. As detailed earlier, accessing networkable devices may be a difficult task. There are devices like Device A 103 and Device E 109 that extend from a surface 101 such as a wall, ceiling, or floor that are easily accessible and visible. However, some devices, such as Device B 105 and Device D 107, may be embedded or hidden in a surface 101 and others may be found in or below a floor or in a surface such as Device C 111, and are therefore physically inaccessible (at least without extra effort). These inaccessible devices make completing network installation much more difficult. Detailed below are embodiments of systems, methods, and apparatuses for installing networkable devices that allow even hidden and/or embedded devices to be accessible for provisioning, etc.

Not shown in this illustration are the connections between the networkable devices. Typically, these devices are coupled to each other (either directly or indirectly) using a wired communication protocol such as powerline communication (PLC), Ethernet, etc. or wireless (IEEE 802.11, IEEE 802.15, etc.) and to a provisioning computer (also not illustrated).

Figure 2:
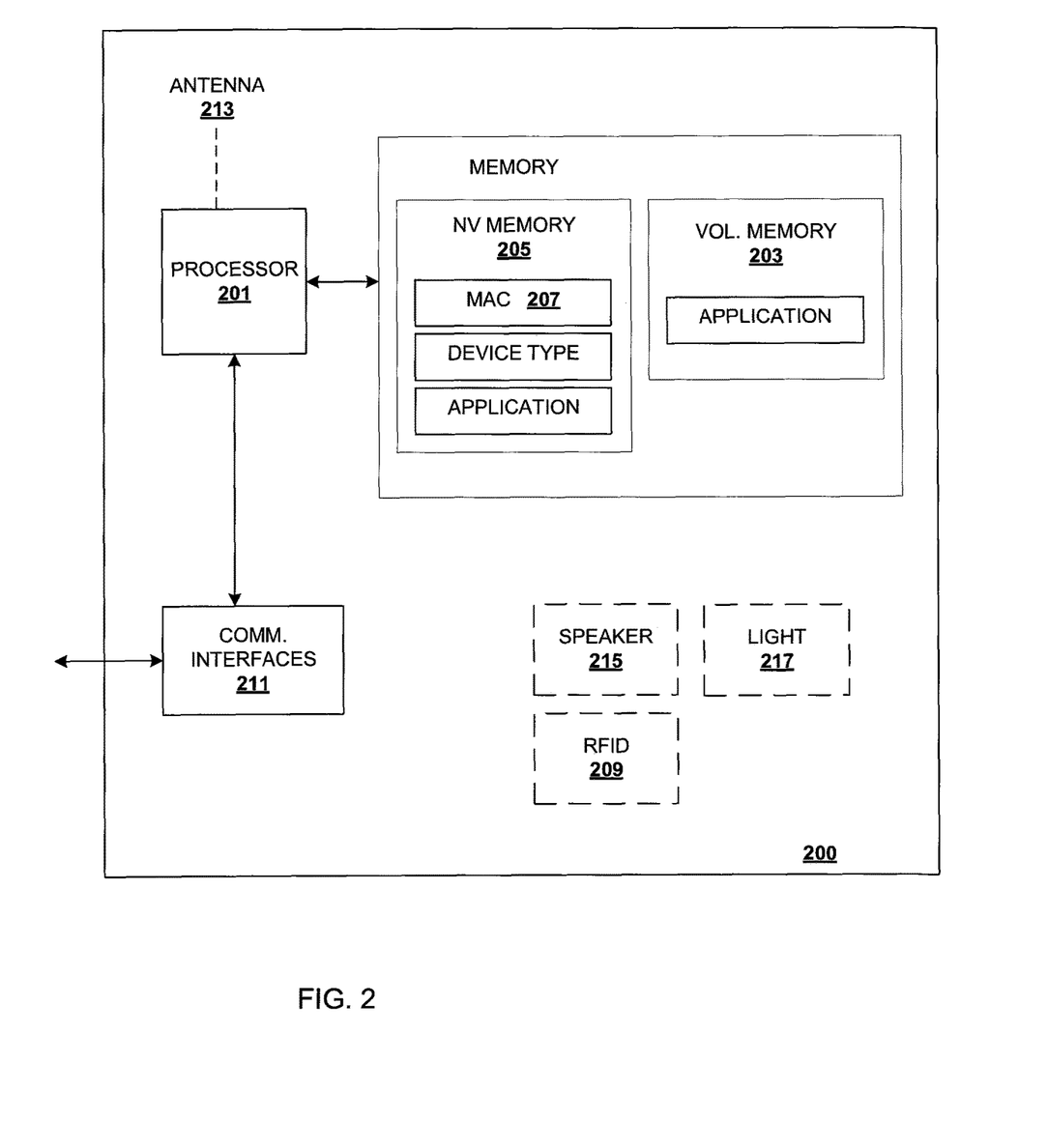
FIG. 2 illustrates an embodiment of a networkable device that may become a node on a network.

FIG. 2 illustrates an embodiment of a networkable device that may become a node on a network. The networkable device 200 includes a hardware processor 201, such as a microprocessor or microcontroller, to execute one or more programs or routines stored on the device 200. These programs or routines may be stored in volatile memory 204 (such as Random Access Memory (RAM)) or non-volatile memory 205 (such as FLASH, ROM, fuses, etc.). In some embodiments, non-volatile memory 205 stores a Media Access Control (MAC) ID or other identification for the device 200.

The networkable device 200 includes at least one packet-based network interface 211 to communicate with devices on or off of the network that the networkable device 200 belongs to. For example, the device 200 may have one or more of: a powerline communication interface, a wireless interface (Institute of Electrical and Electronics Engineers (IEEE) 802.11, IEEE 802.15 (Bluetooth, Bluetooth LE, Zigbee, 6LoWPAN, near field communication (NFC) such as ISO/IEC 14443, ISO/IEC 18092, ISO 18000-3 devices, etc.), or other radio frequency protocol), or non-powerline based wired interfaces (IEEE 802.3, etc.). In some embodiments, an antenna 213 is provided through wire(s) coupled to one or more input/output pins of the hardware processor 201.

In some embodiments, the device 200 includes a radio-frequency identification (RFID) component 209. This component 209 may be an external tag attached to the device 200 or an integrated circuit within the device. The RFID component 209 may be active, passive, or battery-assisted passive. In some embodiments, the RFID component 209 operates in an ISM band of 865-868 MHZ or 902-928 MHz. In some embodiments, the RFID component stores an identifier (such as a MAC identifier) for the device. The RFID component may also store a device type (light, switch, etc.) for the networkable device 200.

Additionally, in some embodiments, the networkable device 200 includes at least one sensory output device such as a speaker 215 or a light 217.

Not shown in the illustration are an internal power supply and/or display which are included in some embodiments of the networkable device 200.

Figure 3:
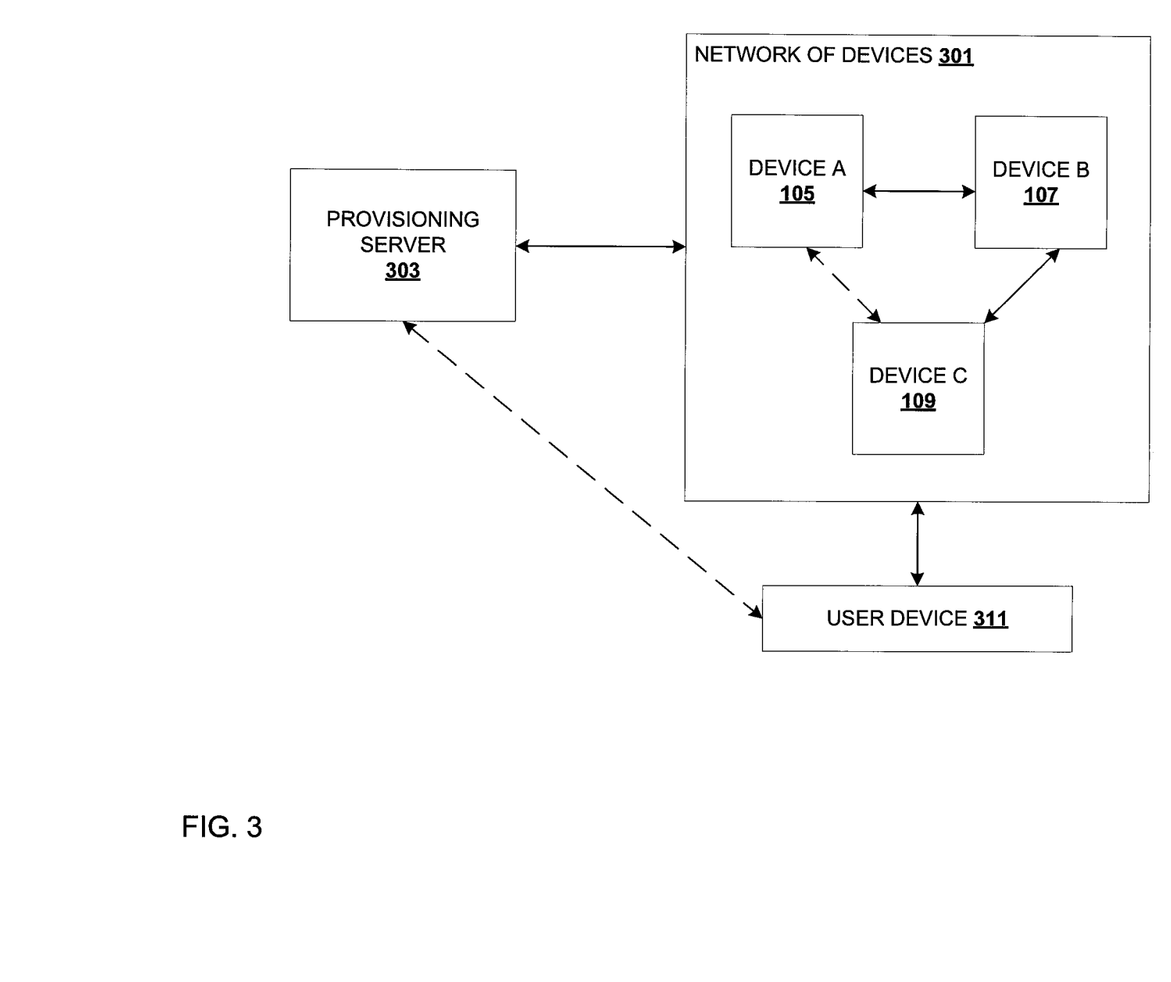
FIG. 3 illustrates an exemplary system according to an embodiment.

FIG. 3 illustrates an exemplary system according to an embodiment. A provisioning server 303 is in communication (wired or wireless) with a network of devices 301. The provisioning server 303 may be used to provision a device onto the network (i.e., provide a network address to the device). In this illustration, the network of devices 301 includes three devices 105, 107, and 109. Device 105 is directly connected to device 107 which is in turn directly connected to device 109. Device 105 may communicate with device 109 through device 107.

A user device 311, such as a smartphone, etc., may communicate with the network of devices and/or the provisioning server as will be detailed below.

Detailed below are several approaches to testing and/or configuring networkable devices. In the first approach, a RFID component is used to provide networkable device information to an installer/administrator. An ID (such as a MAC ID) and device type is encoded into the RFID component of the networkable device. In some embodiments, the RFID component is a passive tag and is attached to the device as noted above. These passive tags have a range of 1-12 meters depending upon the power output of the reader.

Typically, a smartphone is used to read the RFID component using a reader, however, other portable devices such as tablet computers or laptops may be used. For ease of understanding, smartphone is used throughout this description, but the description is applicable to tablet computers, laptops, etc. In some embodiments, the reader plugs into an audio port of the reading device and uses the audio port for power. In other embodiments, the reader plugs into a communication port of the device such as a Universal Serial Bus (USB) or microUSB port. The reader includes a directional antenna for reading the RFID tags and an output link to the smartphone using Bluetooth, Bluetooth LE, Near Field Communication (NFC), WiFi, etc. Typically, an application on the smartphone includes a diagram of the network showing networkable device locations and allows a user to associate a selected networkable device on that diagram with the output of the RFID reader after a user actuates the reader. This smartphone includes memory to store instructions which when executed by a processor of the smartphone performs one or more aspects of the methods detailed below.

Figure 4:
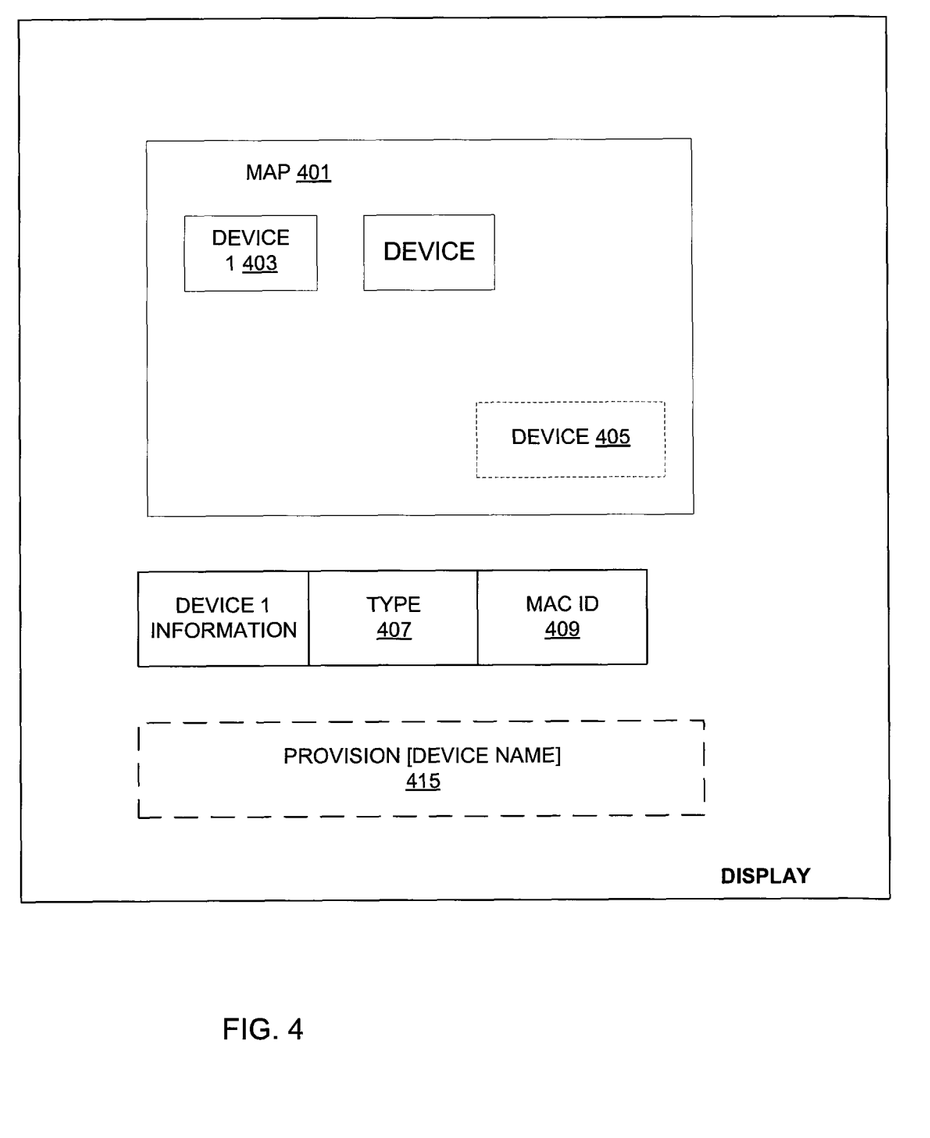
FIG. 4 illustrates an embodiment of a display provided by an application of a smartphone, laptop, etc.

FIG. 4 illustrates an embodiment of a display provided by an application of a smartphone, laptop, etc. to be used in the following methods. The device's display provides a map 401 of the network of devices that a user wishes to provision and/or check. The map 401 includes devices that have been checked and/or provisioned (shown as a solid box) 403 and devices that either cannot be communicated with or have not been checked and/or provisioned (shown as an empty box) 405.

In some embodiments, the application shows at least one "read" device and its associated information such as device type 407 and/or MAC ID 409. The application may also include a means for provisioning a device such as shown in box 415.

Figure 5:
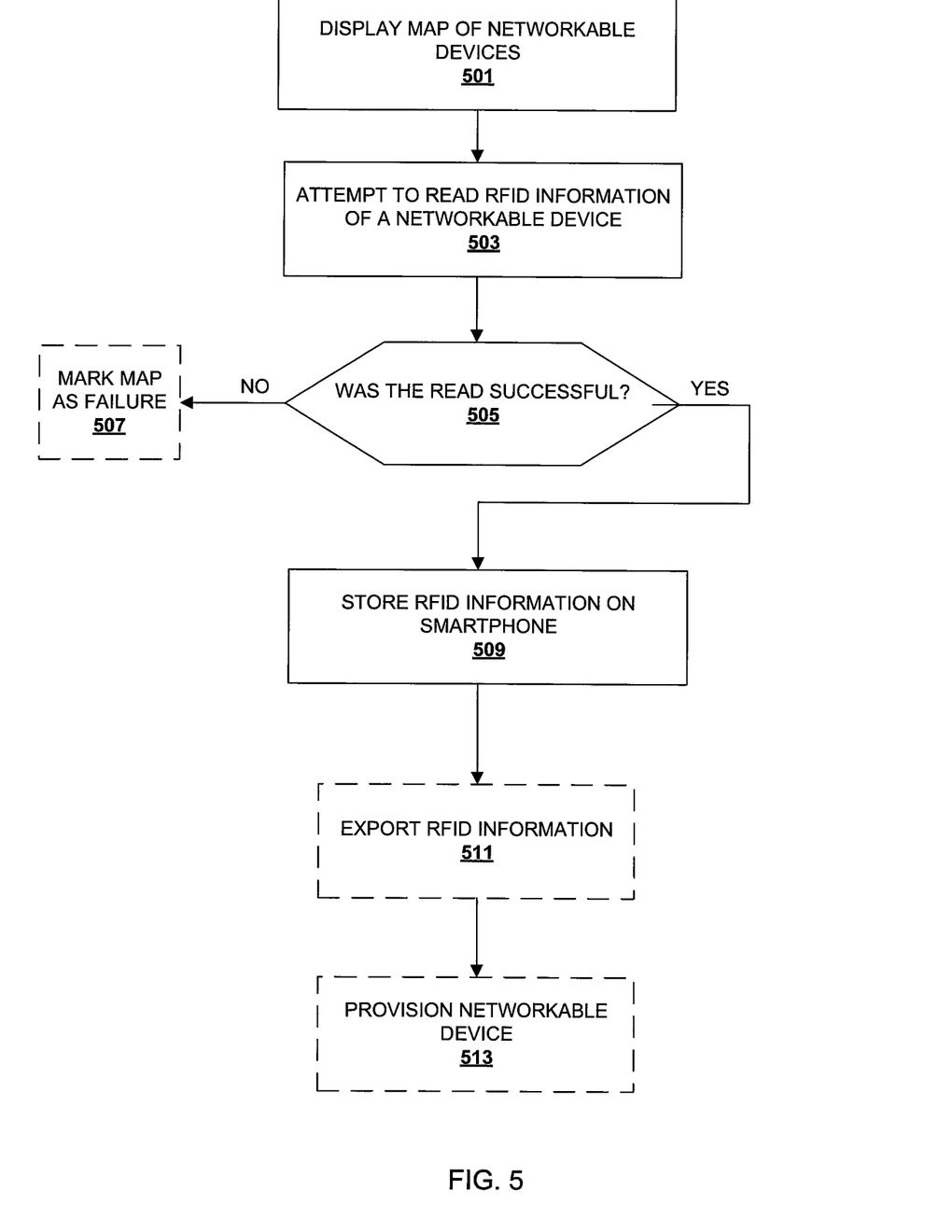
FIG. 5 illustrates an embodiment of a method for testing and/or configuring one or more networkable devices.

FIG. 5 illustrates an embodiment of a method for testing and/or configuring one or more networkable devices, wherein the devices include a passive RFID component such as RFID component 209, using a smartphone. At 501, an application installed on the smartphone displays a map of the network being tested/configured. This map shows known locations of the networkable devices including those that have RFID components. As detailed above, this application is stored in memory on the smartphone and executed by the processor of the smartphone.

At 503, RFID information is received from a networkable device by the smartphone's RFID reader. This information includes an identifier such as a MAC ID and/or a device type. In some embodiments, the application for the RFID reader is called from the same application used to display the map. In other embodiments, the RFID reader application is a separate application that communications with the map application.

At 505, a determination of if the read was successful is made by the application. For example, has a properly formatted MAC ID been received? If not, then in some embodiments a mark is made on the map to indicate a networkable device location that failed at 507. If yes, then the received information, or a portion thereof, is stored in the smartphone at 509. This information is correlated with the device's information in the smartphone application such as associating it with the location information. In some scenarios, additional input may be required to correlate the received information with a device. For example, multiple networkable devices may be in close proximity and should be properly aligned with the received MAC ID. In some embodiments, the smartphone application may receive input (such as a tap on the screen) indicating which device is the correct one to associate the MAC ID with.

In some embodiments, this information is exported to a commissioning/provisioning application at 511. This exportation allows for the networkable device to be commissioned/provisioned at 513 and may include a request for provisioning using, for example, the MAC ID. In some embodiments, the information is exported without a provisioning request.

The above may be repeated until the desired networkable devices have been tested. For example, after the storage on the smartphone of received RFID data a read of another networkable device is attempted.

In an exemplary scenario, a system designer walks a jobsite to verify the networkable devices are correctly placed and functional. He selects a device on the smartphone's map, goes to the location and points the reader in the general direction of where the node should be and actuates the reader. The application of the smartphone then displays the device type and MAC ID and records that onto the system map. The designer then proceeds to the next node until all the locations have been visited and the MAC IDs have been captured. Any failures result in work orders to the installer. Then the system designer exports the MAC ID/Location/Device Type information into an installation tool and the networkable devices are commissioned over the network.

Since the RFID tags are not powered, this method has the advantage that the system can be verified with regard to networkable device placement without it being powered up—an advantage for new construction where the power has not been turned on yet.

A second approach utilizes a low power or short range radio included with the networkable device to broadcast information about the networkable device to a reader such as a smartphone. In this approach, in some embodiments, application I/O pins of the processor of the networkable device create a simple, short range radio and antenna. Typically, wires are coupled to 213 the processor 201 to create one or more antennas. In other embodiments, radios such as 6LowPan, Bluetooth, Bluetooth LE, Near Field Communication (NFC), WiFi, etc. are used.

Figure 6:
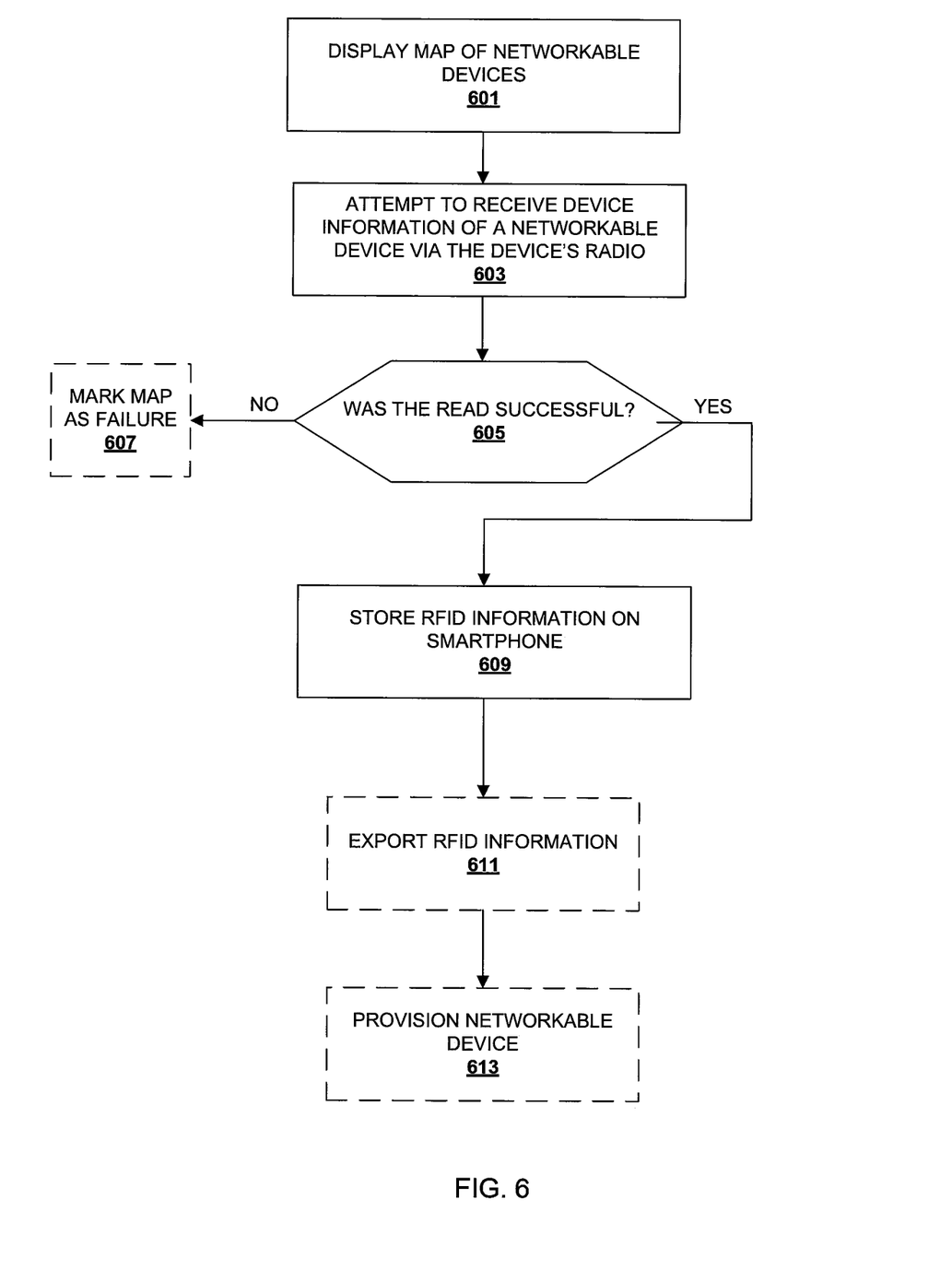
FIG. 6 illustrates an embodiment of a method for testing and/or configuring one or more networkable devices.

FIG. 6 illustrates an embodiment of a method for testing and/or configuring one or more networkable devices, wherein the devices include an antenna coupled to its processor, using a smartphone. In this method, power is supplied to the networkable devices to at least turn on the processor.

At 601, an application installed on the smartphone displays a map of the network being tested/configured. This map shows known locations of the networkable devices including those that have RFID components.

At 603, an attempt to communicate with a networkable device's radio is performed. Typically, this is done using an application on the smartphone as previously detailed. This communication is attempting to get information that includes an identifier such as a MAC ID and a device type. In some embodiments, the communication application is called from the same application used to display the map. In other embodiments, the communication application is a separate application that communications with the map application. In some embodiments, the initial communication (request) to the networkable device is received by the networkable device over the I/O antenna and the transmission from the networkable device to be received by the smartphone uses a different communication interface such as 6LowPan, Bluetooth, Bluetooth LE, Near Field Communication (NFC), WiFi, etc.

At 605, a determination of if the read was successful is made. For example, has a properly formatted MAC ID been received? If not, then in some embodiments a mark is made on the map to indicate a networkable device location that failed at 607. If yes, then the received information, or a portion thereof, is stored in the smartphone at 609. This information is correlated with the device's information in the smartphone application such as associating it with the location information. In some scenarios, additional input may be required to correlate the received information with a device. For example, multiple networkable devices may be in close proximity and should be properly aligned with the received MAC ID. In some embodiments, the smartphone application may receive input (such as a tap on the screen) indicating which device is the correct one to associate the MAC ID with.

In some embodiments, this information is exported to a commissioning/provisioning application at 611. This exportation allows for the networkable device to be commissioned/provisioned at 613 and may include a request for provisioning using, for example, the MAC ID. In some embodiments, the information is exported without a provisioning request.

The above may be repeated until the desired networkable devices have been tested. For example, after the storage on the smartphone of received data a read of another networkable device is attempted.

Figure 7:
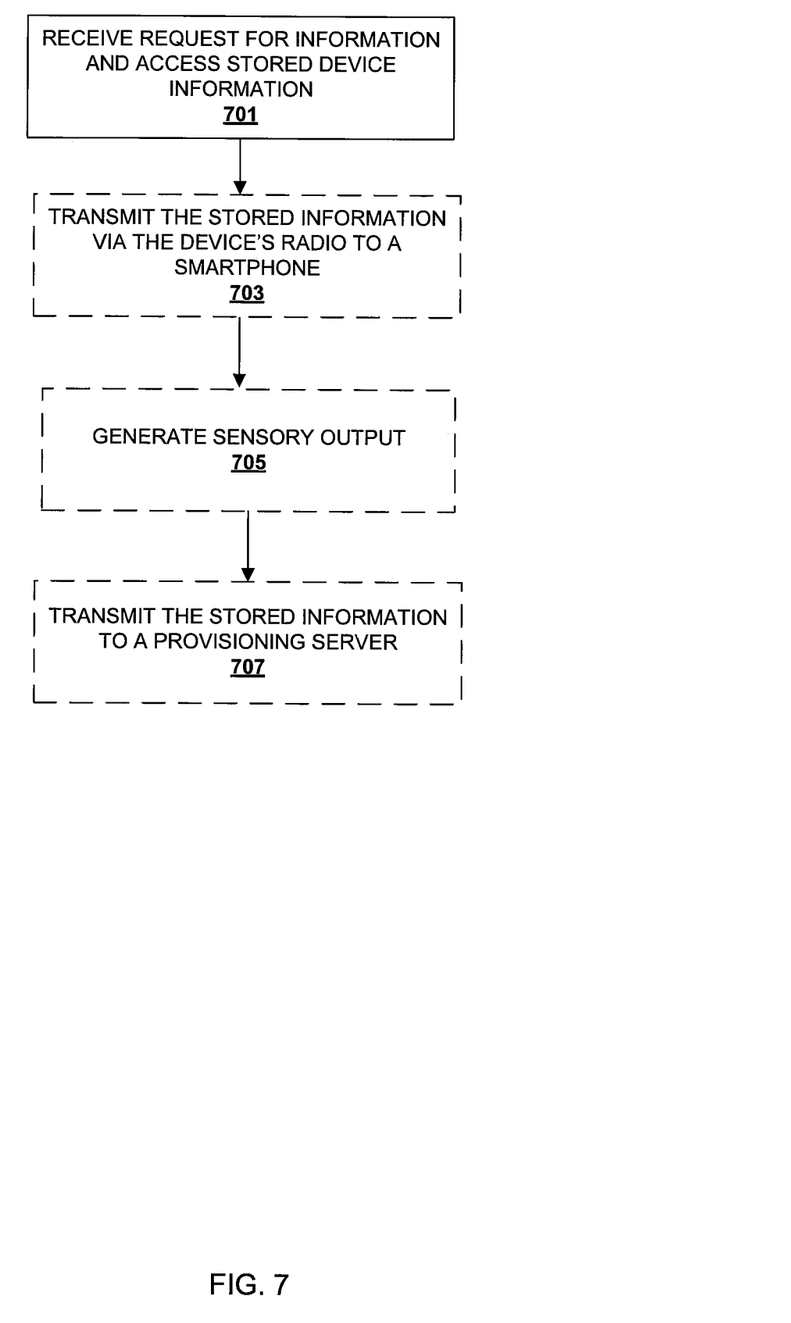
FIG. 7 illustrates an embodiment of a method for installation of a networkable device.

On the networkable device side, at 701, upon receiving a communication request for information, the processor of the networkable device accesses the stored ID (MAC) and/or device type (which are stored in non-volatile memory). As noted above, an initial request is typically received via the I/O antenna. However, other communication interfaces such as 6LowPan, Bluetooth, Bluetooth LE, Near Field Communication (NFC), WiFi, etc. may be used.

FIG. 7 illustrates an embodiment of a method for installation of a networkable device. In some embodiments, at 703, the networkable device transmits this information to the requesting smartphone. In some embodiments, this transmission uses the I/O antenna. In other embodiments, a different communication interface is used such as 6LowPan, Bluetooth, Bluetooth LE, Near Field Communication (NFC), WiFi, etc.

Further, in some embodiments, the networkable device creates a sensory output such as generating a sound or turning on a light to indicate successful communication at 705.

In some embodiments, the networkable device transmits its information using the control network it is coupled to at 707 so that is may be commissioned/provisioned. Of course, one or more of the steps of 703-07 may be performed.

In an exemplary scenario, a system designer walks a jobsite to verify the networkable devices are correctly placed and functional as before. Typically, the smartphone device as described above has the same functionality. When the designer walks the job site, the networkable devices are powered up and their microcontrollers active. Then when the networkable devices receive the signal from the smart phone they can both report their information and do something visible, such as cycle a light, or audible such as buzz, etc. The smartphone application stores the information provided by the node. Additionally, the networkable devices can report their information over the control network so that the commissioning tool can begin the download of the provisioning information. While this approach typically consumes I/O on the microcontroller and requires the network to be powered, it is more automated because the commissioning tool operation can be integrated with the inspection of the installer's work.

A third approach utilizes a location mechanism in the smartphone to determine an approximate location of a networkable device. For example, a sensor embedded within the device (micro-electrical mechanical systems (MEMS) sensors or global positioning system (GPS) chips) or WiFi location technology may be used to determine the smartphone's location. This approach may be used in conjunction with a low power or short range radio or RFID component included with the networkable device to broadcast information about the networkable device to a reader such as a smartphone. These components have been detailed above.

Figure 8:
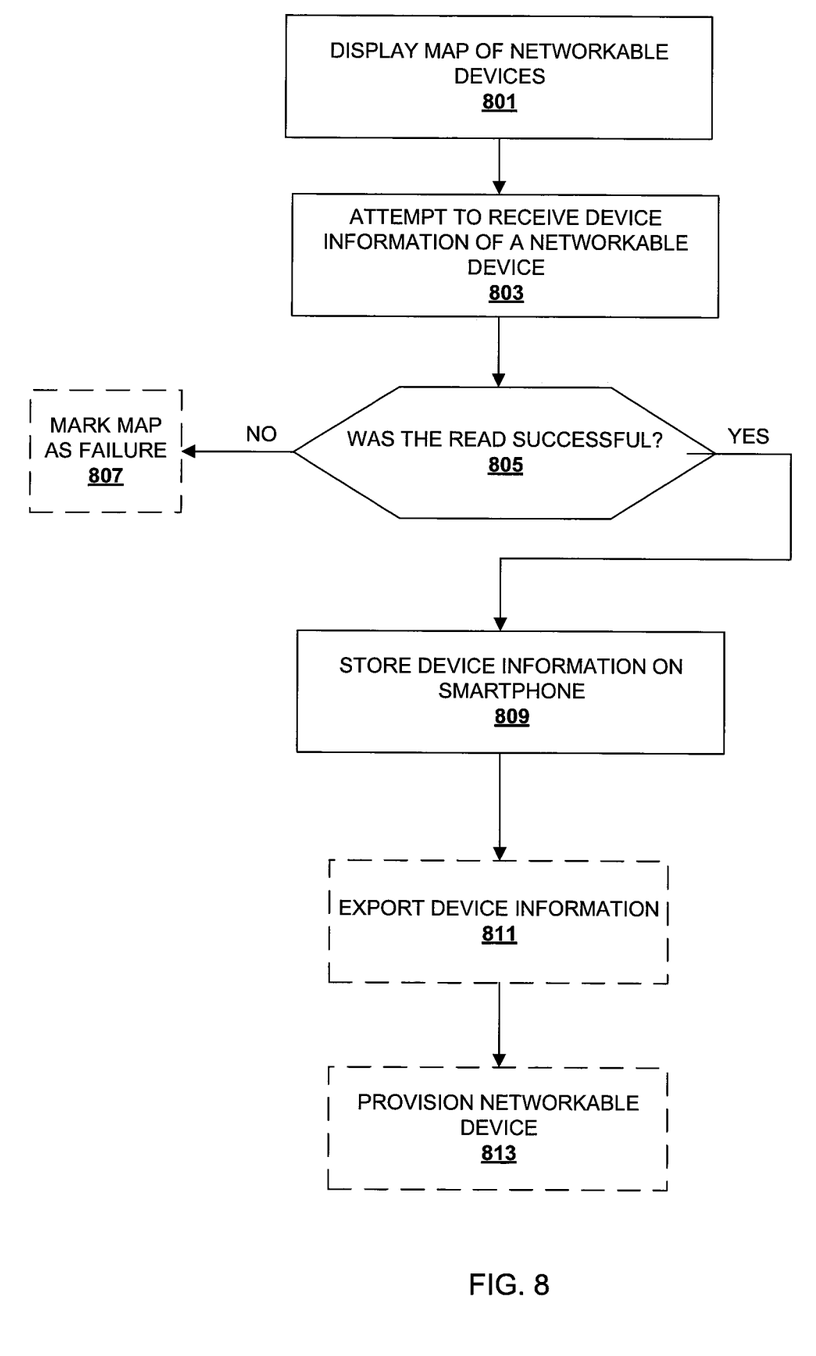
FIG. 8 illustrates an embodiment of a method for testing and/or configuring one or more networkable devices using location capabilities of a smartphone.

FIG. 8 illustrates an embodiment of a method for testing and/or configuring one or more networkable devices using location capabilities of a smartphone. If not enabled, a location capability of the smartphone is activated prior to the following steps.

At 801, an application installed on the smartphone displays a map of the network being tested/configured and the position of the smartphone in that map. This map shows the locations of the networkable devices including those that have RFID components.

At 803, an attempt, by the software of the smartphone, to communicate with a networkable device is performed after the smartphone is within communication range with the device as determined by the location capability of the smartphone. In most environments this attempt is made without user intervention. This communication is attempting to get information that includes an identifier such as a MAC ID and a device type. In some embodiments, the communication application is called from the same application used to display the map. In other embodiments, the communication application is a separate application that communications with the map application. In some embodiments, the initial communication (request) to the networkable device is received by the networkable device over the I/O antenna and the transmission from the networkable device to be received by the smartphone uses a different communication interface such as 6LowPan, Bluetooth, Bluetooth LE, Near Field Communication (NFC), WiFi, etc.

At 805, a determination of if the read was successful is made. For example, has a properly formatted MAC ID been received? If not, then in some embodiments a mark is made on the map to indicate a networkable device location that failed at 807. If yes, then the received information, or a portion thereof, is stored in the smartphone at 809. This information is correlated with the device's information in the smartphone application such as associating it with the location information. In some scenarios, additional input may be required to correlate the received information with a device. For example, multiple networkable devices may be in close proximity and should be properly aligned with the received MAD ID. In some embodiments, the smartphone application may receive input (such as a tap on the screen) indicating which device is the correct one to associate the MAC ID with.

In some embodiments, this information is exported to a commissioning/provisioning application at 811. This exportation allows for the networkable device to be commissioned/provisioned at 813 and may include a request for provisioning using, for example, the MAC ID. In some embodiments, the information is exported without a provisioning request.

In an exemplary scenario, a system designer walks a jobsite to verify the networkable devices are correctly placed and functional as before. With a scaled map of the jobsite, and the system designer specifies his initial location (or gets it from GPS if accurate enough), then when the system designer walks the job, the smartphone detects when it is near a device and actuates the reader and tells the system designer that a device has been acquired.

In a fourth approach, the smartphone's voice recognition capabilities are used in conjunction with the smartphone's location mechanism. This approach may be used in conjunction with a low power or short range radio or RFID component included with the networkable device to broadcast information about the networkable device to a reader such as a smartphone. These components have been detailed above.

Figure 9:
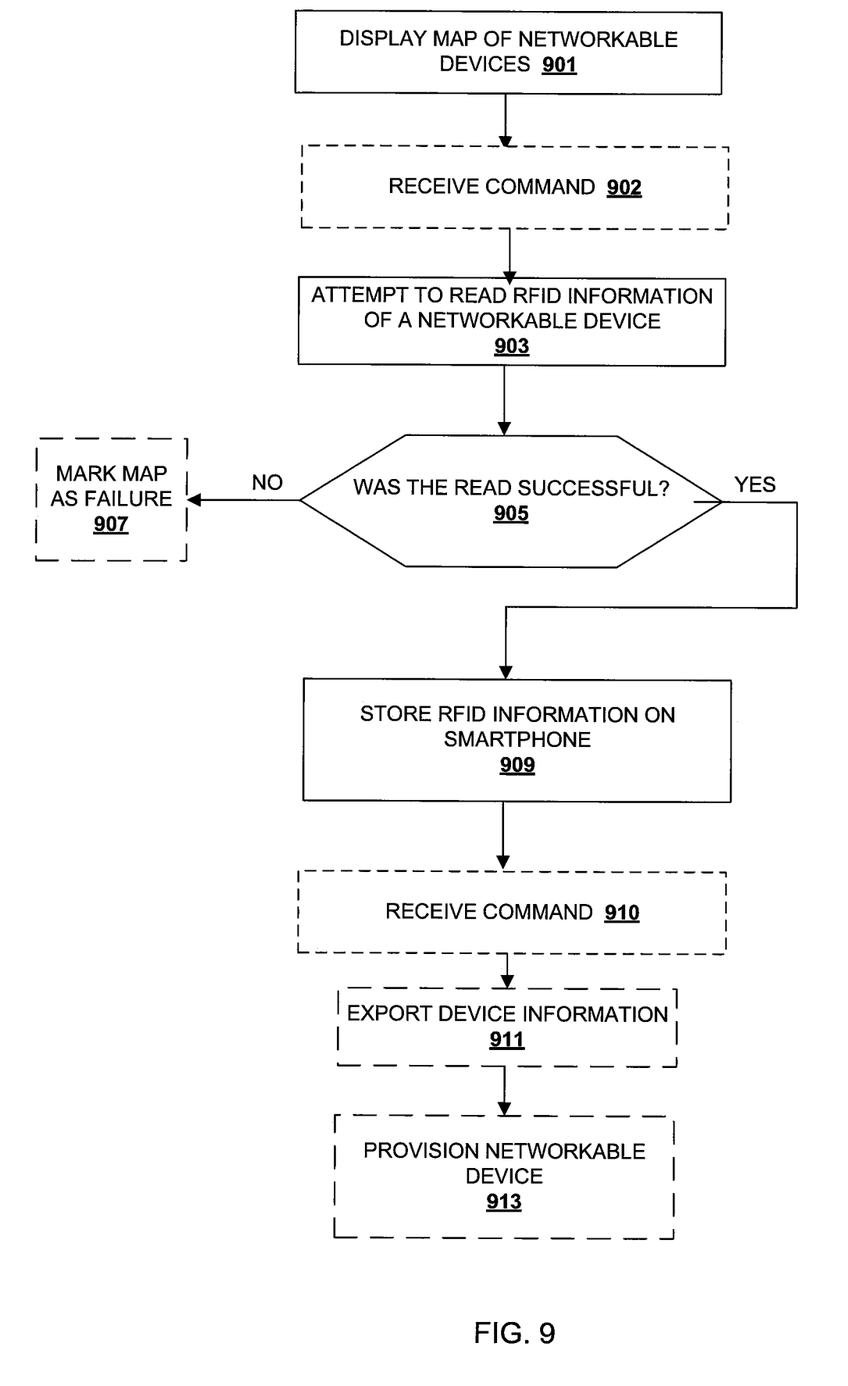
FIG. 9 illustrates an embodiment of a method for testing and/or configuring one or more networkable devices using location capabilities of a smartphone

FIG. 9 illustrates an embodiment of a method for testing and/or configuring one or more networkable devices using location capabilities of a smartphone. If not enabled, a location capability and a voice recognition capability of the smartphone are activated.

In some embodiments, at 901, an application installed on the smartphone displays a map of the network being tested and/or configured and the position of the smartphone in that map. This map shows the locations of the networkable devices including those that have RFID components.

At 903, an attempt, by the software of the smartphone, to communicate with one or more networkable devices is performed after the smartphone is within communication range with the device as determined by the location capability of the smartphone. This communication is attempting to get information that includes an identifier such as a MAC ID and a device type. In some embodiments, the communication application is called from the same application used to display the map. In other embodiments, the communication application is a separate application that communications with the map application. In some embodiments, the initial communication (request) to the networkable device is received by the networkable device over the I/O antenna and the transmission from the networkable device to be received by the smartphone uses a different communication interface such as 6LowPan, Bluetooth, Bluetooth LE, Near Field Communication (NFC), WiFi, etc.

In some embodiments, the attempt of 903 is made in response to a user command received at 902. In some embodiments, the smartphone receives a command from a user with respect to a device on the map. For example, the smartphone may receive and interpret a voice command from the user such as "Connect this switch to this light." In this scenario, both the switch and the light belong to the network and can be operatively coupled together. Typically, the command is in the form of an action (such as test, connect, turn on, etc.) and an identification of a networkable device. The identification of the networkable device may be contextually identifiable by the location of the smartphone ("this" in the exemplary voice command), or specific (for example, instead of this the MAC ID is spoken by a user and received by the smartphone). A confirmation may be provided by the smartphone of the action being completed in terms of the smartphone's capability (the mapping of action to device may require information be sent to a provisioning server). Additionally, in some embodiments, a confirmation by the user is required (such as a physical action like pushing a switch or an action on the smartphone).

At 905, a determination of if the read(s) was/were successful is/are made. For example, has a properly formatted MAC ID been received from each device? If not, then in some embodiments a mark is made on the map to indicate a networkable device location that failed at 907. If yes, then the received information, or a portion thereof, is stored in the smartphone at 909. If necessary, this information is correlated with the device's information in the smartphone application such as associating it with the location information. In some scenarios, additional input may be required to correlate the received information with a device. For example, multiple networkable devices may be in close proximity and should be properly aligned with the received MAD ID. In some embodiments, the smartphone application may receive input (such as a tap on the screen) indicating which device is the correct one to associate the MAC ID with.

In some embodiments, after a device has been correlated, a received user command such as those detailed above is received by the smartphone at 910. For example, the smartphone may receive and interpret a voice command from the user such as "Connect the switch to the light" as detailed above. In this scenario, both the switch and the light belong to the network and can be operatively coupled together. Typically, the command is in the form of an action (such as test, connect, turn on, etc.) and an identification of a networkable device. The identification of the networkable device may be contextually identifiable by the location of the smartphone ("the" in the exemplary voice command), or specific (for example, instead of this the MAC ID is spoken by a user and received by the smartphone). By simply being in proximity to the device upon which an action is desired, a user can use a smartphone to do actions that would otherwise require knowledge of the provisioning procedure. Additionally, in some embodiments, a confirmation by the user is required (such as a physical action like pushing a switch or an action on the smartphone).

In some embodiments, this information, including a result of any received command(s), is exported to a commissioning/provisioning application at 911 along with a command to provision as requested (for example, tying a light to a switch). This exportation allows for the networkable device to be commissioned/provisioned at 913.

In an exemplary scenario, a smart phone with voice recognition interface that has some networkable device communication module (RFID, Integrated low power/short range radio, etc.) is used by to allow a person to say "connect this switch (while pointing at it) to these lights (pointing to each in turn)."

Figure 10:
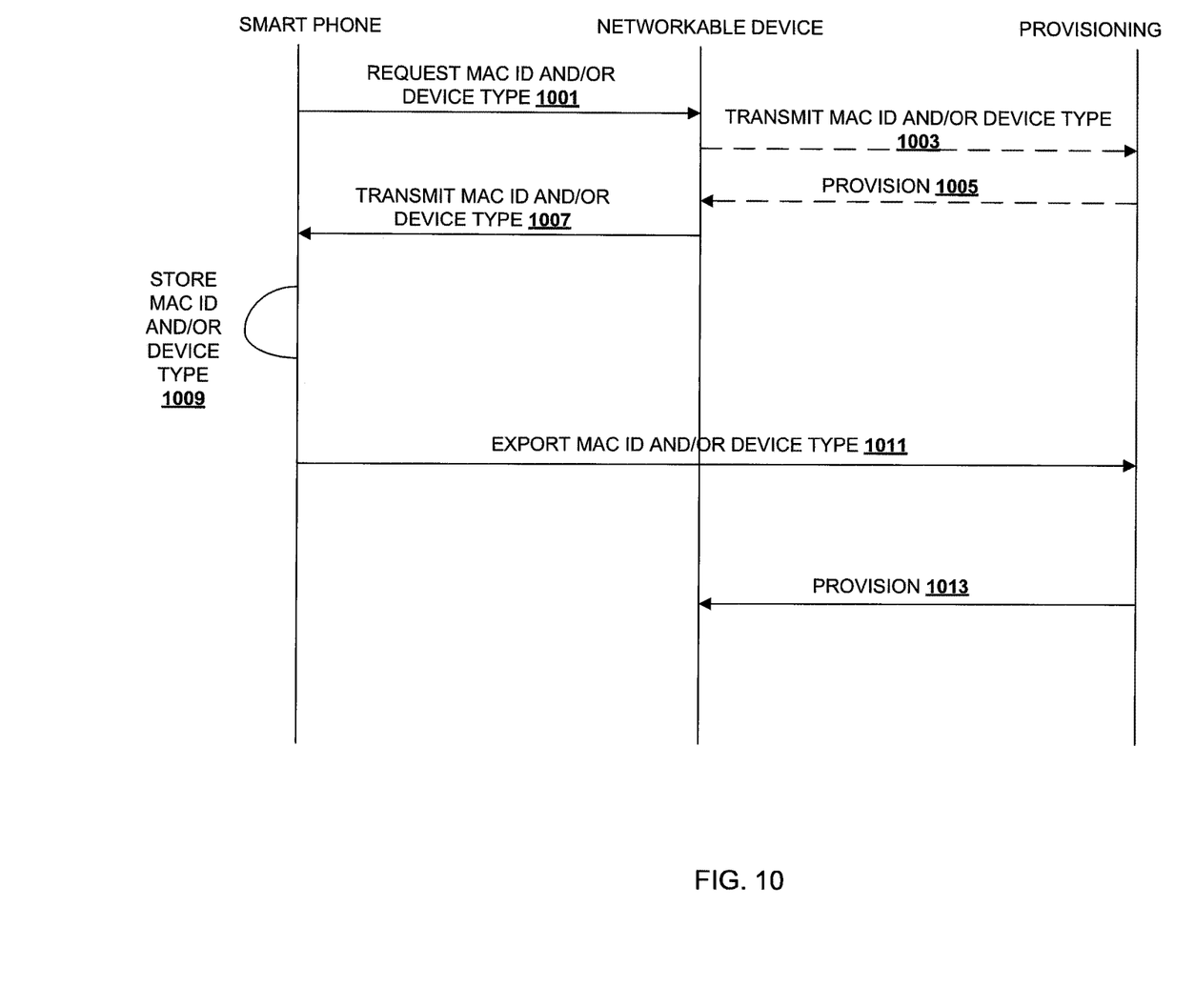
FIG. 10 illustrates an embodiment of communications and actions of various components.

FIG. 10 illustrates an embodiment of communications and actions of various components of the above methods. A smartphone requests a MAC ID and/or device type from a networkable device at 1001. Of course, the smartphone may request a different type of ID.

In some embodiments, the networkable device transmits the requested ID and/or device type to a provisioning server at 1003. The provisioning server may then provision the networkable device at 1005.

In some embodiments, the requested MAC ID and/or device type is transmitted from the networkable device to the requesting smartphone at 1007. The smartphone stores the received MAC ID and/or device type at 1009.

In some embodiments, the MAC ID and/or device type is exported (and transmitted) to a provision server at 1011. The provisioning server may then provision the networkable device at 1013.

Figure 11:
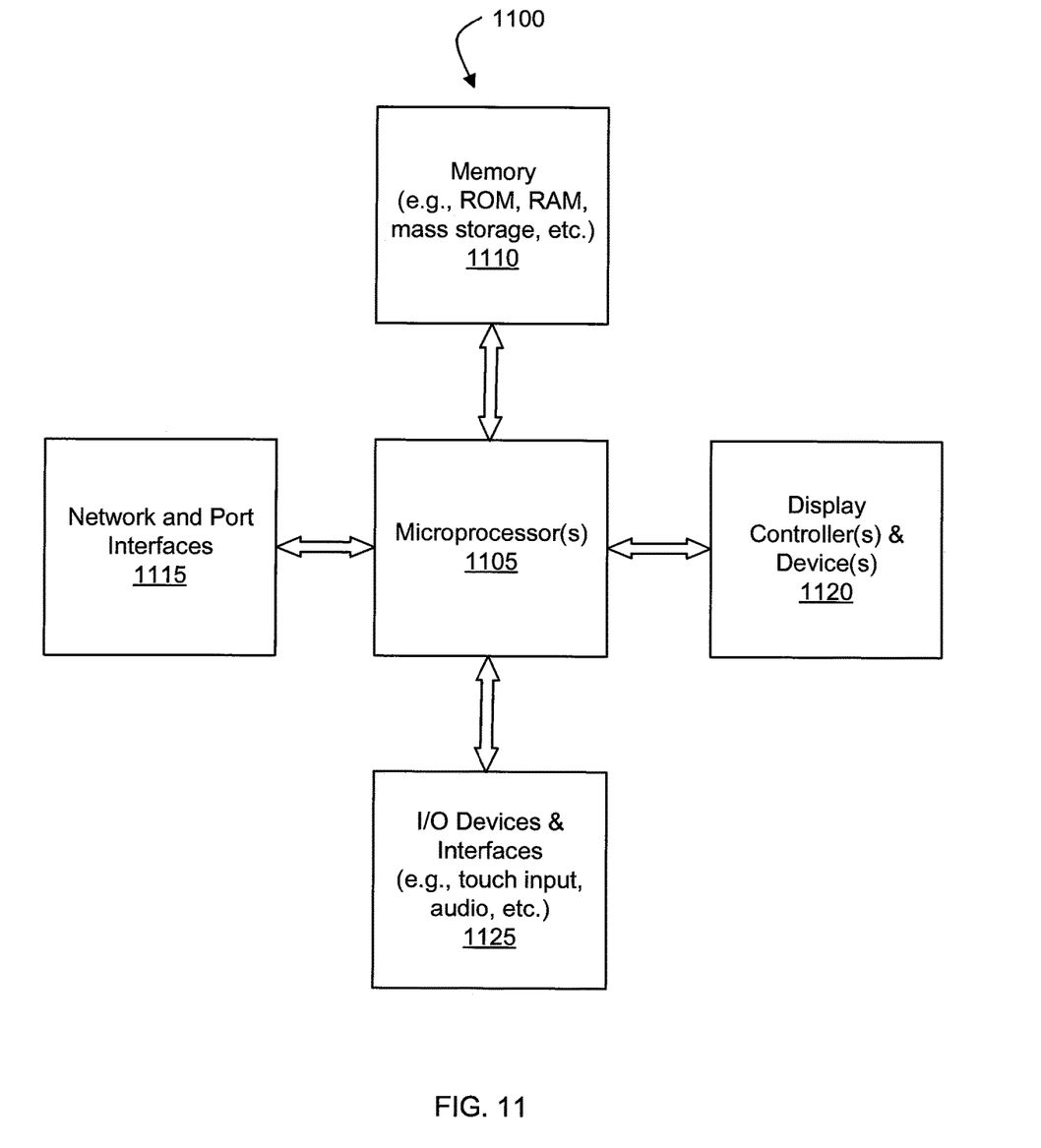
FIG. 11 illustrates, in block diagram form, an exemplary processing system 1100 to perform one or more aspects of the methods.

FIG. 11 illustrates, in block diagram form, an exemplary processing system 1100 to perform one or more aspects of the methods detailed above. In some embodiments, this is a high-level view of a smartphone described herein. Data processing system 1100 includes one or more microprocessors 1105 and connected system components (e.g., multiple connected chips). Alternatively, data processing system 1100 is a system on a chip.

Data processing system 1100 includes memory 1110, which is coupled to microprocessor(s) 1105. Memory 1110 may be used for storing data, metadata, and programs for execution by the microprocessor(s) 1105. For example, memory 1110 may include one or more of the data stores 101 and/or may store modules described herein. Memory 1110 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1110 may be internal or distributed memory.

Data processing system 1100 includes network and port interfaces 1115, such as a port, connector for a dock, or a connector for a USB interface, FireWire, Thunderbolt, Ethernet, Fibre Channel, etc. to connect the system 1100 with another device, external component, or a network. Exemplary network and port interfaces 1115 also include wireless transceivers, such those detailed above include an IEEE 802.11 transceiver, an infrared transceiver, a Bluetooth transceiver, a wireless cellular telephony transceiver (e.g., 2G, 3G, 4G, etc.), or another wireless protocol to connect data processing system 1100 with another device, external component, or a network and receive stored instructions, data, tokens, etc.

Data processing system 1100 also includes display controller and display device 1120 and one or more input or output ("I/O") devices and interfaces 1125. Display controller and display device 1120 provides a visual user interface for the user. I/O devices 1125 allow a user to provide input to, receive output from, and otherwise transfer data to and from the system. I/O devices 1125 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 11.

Data processing system 1100 is an exemplary representation of one or more of the smartphone, etc. described above. For example, data processing system 1100 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 1100 may be a network computer, server, or an embedded processing device within another device or consumer electronic product. As used herein, the terms computer, device, system, processing system, processing device, and "apparatus comprising a processing device" may be used interchangeably with data processing system 1100 and include the above-listed exemplary embodiments.

Additional components, not shown, may also be part of data processing system 1100, and, in certain embodiments, fewer components than that shown in FIG. 11 may also be used in data processing system 1100. It will be apparent from this description that aspects of the inventions may be embodied, at least in part, in software. That is, the computer-implemented method(s) detailed above may be carried out in a computer system or other data processing system 1100 in response to its processor or processing system 1105 executing sequences of instructions contained in a memory, such as memory 1110 or other non-transitory machine-readable storage medium. The software may further be transmitted or received over a network (not shown) via network interface device 1115. In various embodiments, hardwired circuitry may be used in combination with the software instructions to implement the present embodiments. Thus, the techniques are not limited to any specific combination of hardware circuitry and software, or to any particular source for the instructions executed by data processing system 1100.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
    attempting to wirelessly communicate with a physically inaccessible networkable device to retrieve an identifier and device type for the physically inaccessible networkable device from the physically inaccessible networkable device;
    receiving the identifier and device type from the physically inaccessible networkable device;
    storing the identifier and device type;
    correlating the stored identifier and device type with stored physical location information about the physically inaccessible networkable device;
    after correlating, sending a request to a provisioning server to remotely provision the physically inaccessible networkable device, wherein the physically inaccessible networkable device is identified by the stored identifier and device type;
    causing the physically inaccessible networkable to create a sensory output to indicate a successful attempt to wirelessly communicate with the physically inaccessible networkable device;
    receiving a verbal command from a user to perform an action with respect to the physically inaccessible networkable device; and
    performing the received verbal command.

2. The computer-implemented method of claim 1, wherein a mobile device attempts to wirelessly communicate with a passive external radio frequency identification (RFID) tag of the physically inaccessible networkable device.

3. The computer-implemented method of claim 2, wherein the RFID tag stores a media access control (MAC) identifier for physically inaccessible networkable device.

4. The computer-implemented method of claim 1, wherein a mobile device attempts to wirelessly communicate with an internal radio frequency identification (RFID) circuit of the physically inaccessible networkable device.

5. The computer-implemented method of claim 1, further comprising:
    displaying a map including a location of the physically inaccessible networkable device.

6. The computer-implemented method of claim 5, further comprising:
    associating the identifier of the physically inaccessible networkable device with the map.

7. The computer-implemented method of claim 1, wherein the mobile device is a smartphone.

8. The computer-implemented method of claim 7, wherein the smartphone includes an audio port and a wireless communication module to communicate with the networkable device plugged into the audio port.

9. The computer-implemented method of claim 1, wherein the mobile device and physically inaccessible networkable device attempt to communicate using a protocol selected from: IEEE 802.11, IEEE 802.15, and near field communication.

10. The computer-implemented method of claim 1, wherein the command includes an action and a contextual identifier of the physically inaccessible networkable device based on a physical location of the mobile device.

11. The computer-implemented method of claim 3, wherein the command includes an action and the MAC identifier.

12. The computer-implemented method of claim 1, further comprising:
    at the physically inaccessible networkable device,
        receiving a request for a stored device identifier, and
        transmitting the stored device identifier using an application input/output (I/O) pin of a processor of the physically inaccessible networkable device as a short range radio and antenna.

13. An apparatus comprising:
    a hardware processor;
    memory coupled to the processor to store instructions, which when executed by the processor cause the apparatus to perform a method comprising:
        attempting to wirelessly communicate with a physically inaccessible networkable device to retrieve an identifier and device type for the physically inaccessible networkable device from the physically inaccessible networkable device;
        receiving the identifier and device type from the physically inaccessible networkable device;
        storing the identifier and device type;
        correlating the stored identifier and device type with stored physical location information about the physically inaccessible networkable device;
        after correlating, sending a request to a provisioning server to remotely provision the physically inaccessible networkable device, wherein the physically inaccessible networkable device is identified by the stored identifier and device type;
        causing the physically inaccessible networkable to create a sensory output to indicate a successful attempt to wirelessly communicate with the physically inaccessible networkable device;
        receiving a verbal command from a user to perform an action with respect to the physically inaccessible networkable device; and
        performing the received verbal command.

14. The apparatus of claim 13, further comprising:
    a wireless interface to wirelessly communicate with the physically inaccessible networkable device.

15. The apparatus of claim 14, wherein the wireless interface is a radio frequency identification (RFID) interface.

16. The apparatus of claim 13, wherein the apparatus and physically inaccessible networkable device attempt to communicate using a protocol selected from: IEEE 802.11, IEEE 802.15, and near field communication.

17. The apparatus of claim 13, wherein the apparatus includes an audio port and a wireless communication module to communicate with the physically inaccessible networkable device plugged into the audio port.

* * * * *